United States Patent
Rasmussen

(10) Patent No.: US 7,891,590 B2
(45) Date of Patent: Feb. 22, 2011

(54) METHOD AND APPARATUS FOR REUSING BITUMINOUS PRODUCTS

(75) Inventor: Karsten Rasmussen, Gentofte (DK)

(73) Assignee: Tagpap Recycling ApS, Horsens (DK)

( * ) Notice: Subject to any disclaimer, the term of this patent is extended or adjusted under 35 U.S.C. 154(b) by 212 days.

(21) Appl. No.: 12/085,103

(22) PCT Filed: Nov. 15, 2006

(86) PCT No.: PCT/DK2006/000631

§ 371 (c)(1),
(2), (4) Date: Aug. 19, 2008

(87) PCT Pub. No.: WO2007/057011

PCT Pub. Date: May 24, 2007

(65) Prior Publication Data

US 2009/0121053 A1    May 14, 2009

(30) Foreign Application Priority Data

Nov. 16, 2005 (DK) ................ 2005 01598

(51) Int. Cl.
*B02C 19/00* (2006.01)
(52) U.S. Cl. .............. 241/22; 241/24.14; 241/24.15; 241/73; 241/79.1; 241/101.6; 241/101.76
(58) Field of Classification Search ........... 241/25, 241/101.8, 73, 24.15, 22, 101.6, 79.1, 24.14, 241/101.76
See application file for complete search history.

(56) References Cited

U.S. PATENT DOCUMENTS

| | | | |
|---|---|---|---|
| 5,201,472 A | 4/1993 | Brock | |
| 6,039,914 A | 3/2000 | Gehrke et al. | |
| 6,186,700 B1 | 2/2001 | Omann | |
| 6,843,435 B2 * | 1/2005 | Verhoef et al. | ........... 241/73 |

FOREIGN PATENT DOCUMENTS

| | | |
|---|---|---|
| DE | 2917067 | 11/1980 |
| DE | 3807983 | 9/1989 |
| EP | 1266692 | 12/2002 |
| EP | 1514603 | 3/2005 |

\* cited by examiner

*Primary Examiner*—Mark Rosenbaum
(74) *Attorney, Agent, or Firm*—James Creighton Wray

(57) ABSTRACT

Method for reusing bituminous products (11), in particular bitumen containing roofing materials and membranes, wherein the bitumen containing products are placed in a second hopper (9), where a particulate material having a grain size between 5 mm and 35 mm is placed in a first hopper (5), and that in the bottom of the second hopper, conveyor means (10) urges the bituminous material into a mixing chamber (8), and that inside said mixing chamber a milling and/or crushing wheel (14) is arranged, which wheel engages and crushes/mills the material transported from the second hopper in an engagement zone, and at the same position as the wheel engages the bituminous material, the particulate material by means of a first conveyor (7) is fed into the engagement zone, and that the wheel's action will fragment the materials and at the same time mix the fragmented bituminous materials and the particulate materials, and transport the material past a sieve (15), where material having a particle size smaller than the sieve size will leave the mixing chamber and be collected and stored in suitable storage means.

14 Claims, 1 Drawing Sheet

METHOD AND APPARATUS FOR REUSING BITUMINOUS PRODUCTS

Figure 1:
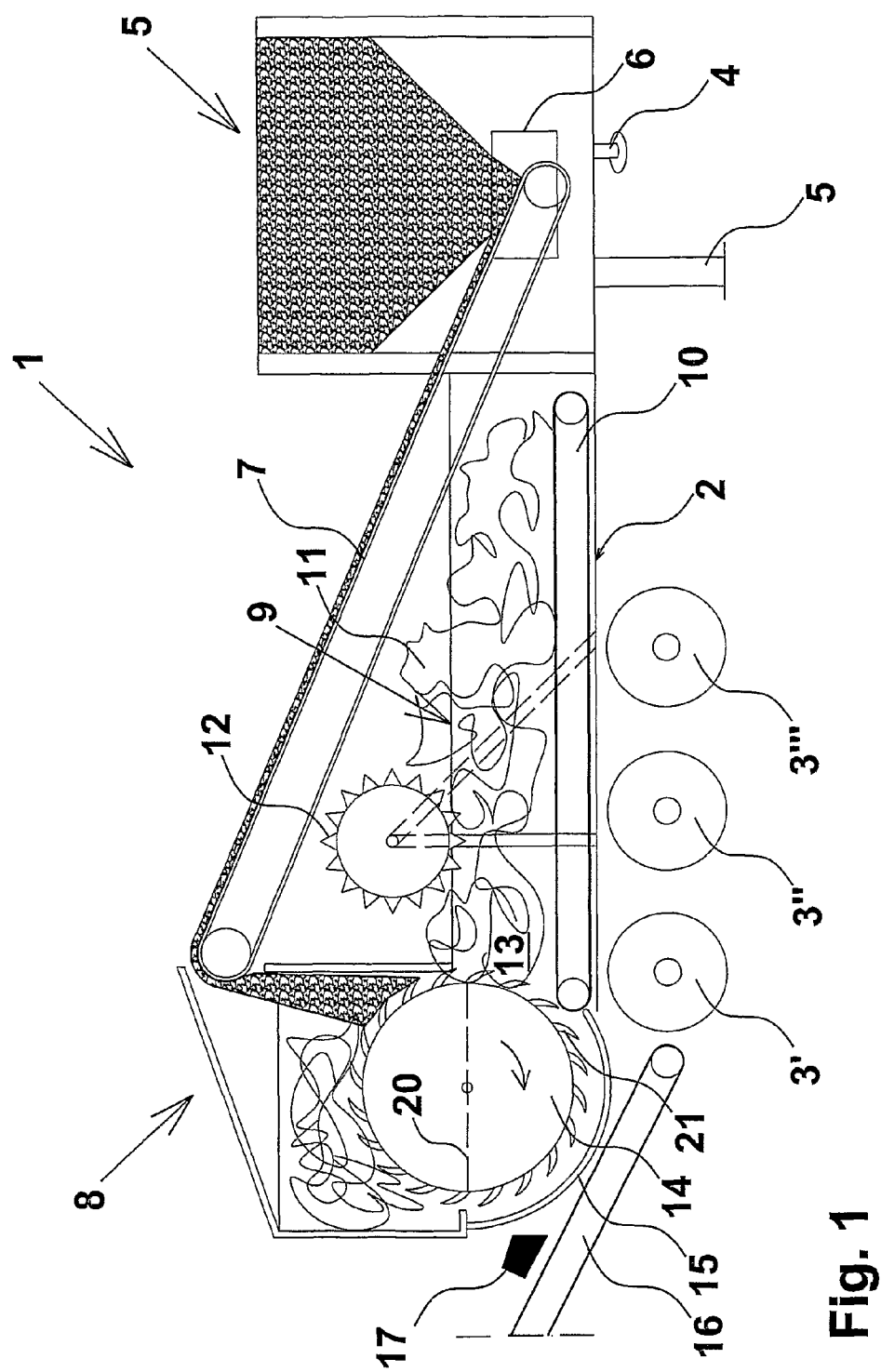

This application claims the benefit of Danish Application No. PA200501598 filed Nov. 16, 2005 and PCT/DK2006/000631 filed Nov. 15, 2006, which are hereby incorporated by reference in their entirety.

SCOPE OF THE INVENTION

The present invention relates to an apparatus as well as a method for reusing bituminous materials in particular bitumen containing roofing materials and membranes.

BACKGROUND OF THE INVENTION

Membranes and roofing materials of this type have a limited life time after which they need to be replaced. Traditionally, the used materials are brought to controlled landfill sites since the bitumen contained in these materials constitute an environmental hazard in that the bitumen may pollute the water such that special measures must be taken in order to store these types of materials.

In the art, it has been suggested in U.S. Pat. No. 6,039,914 to reuse these types of waste in a process where the bituminous materials are transformed into a crumble which crumble thereafter is shaped into a building block whereafter the building block is consolidated by for example infrared heating such that the bitumen will melt and thereby create the interior integrity of the building block. The asphalt crumble is created by introducing the bituminous waste material into a hammer mill wherein hammers are rotated such that they impact on the material and thereby shatter the waste material into small particle sizes. In practice, however, it has proven that due to the bituminous content of the waste materials and the sticky consistency of bitumen at certain temperatures, the hammer mill will be smeared with bitumen, and eventually there is a potential risk that the hammer mill all together will become clocked due to the sticky substance of the bituminous materials. Furthermore, reusing the bituminous materials by creating a crumble and thereafter shaping the crumble into building blocks by the addition of heat, is first of all a rather costly process, and moreover a market for disposing of a rather high number of the building blocks must be established. This even more so, as the building blocks made from a bituminous material do not exhibit high compressive or tensile strength characteristics and are therefore only usable in a very limited range of applications.

Another example is known from U.S. Pat. No. 5,201,472 wherein the scrap bituminous material is first shredded in a Telsmith shredder. After shredding the shredded material is passed through a sieve arrangement, where the material having sizes allowing it to pass the sieve is mixed with an aggregate, and "oversizes" left on the sieve is brought back to the shredder. In this way the mixing process involves two different apparatuses and method steps, i.e. a shredder and a mixer. The bituminous material is handled by the shredder, without any cleaning steps forseen, which may cause the shredder to clog up due to the sticky and adhesive nature of the bituminous material.

OBJECT OF THE INVENTION

It is an object of the present invention to provide an apparatus as well as a method for reusing bituminous materials in particular bitumen containing roofing materials and membranes where the resulting product may be reused in other bitumen containing applications such as for example road pavements where the bitumen content of the waste material may substitute freshly added bitumen to the asphalt composition and thereby the waste material in addition to being a useful filler also provides substantial savings in the overall costs in that the bitumen as such may be reused in the asphalt structure. Where the production process is simple and reliable, and avoids the disadvantages of prior art devices.

BRIEF DESCRIPTION OF THE INVENTION

The present invention provides a method for reusing bituminous products, in particular bitumen containing roofing materials and membranes, wherein the bitumen containing products are placed in a second hopper, where a particulate material having a grain size between 5 mm and 35 mm is placed in a first hopper, and that in the bottom of the second hopper conveyor means urges the bituminous material into a mixing chamber, and that inside said mixing chamber a milling and/or crushing wheel is arranged, which wheel engages and crushes/mills the material transported from the second hopper in an engagement zone, and at the same position as the wheel engages the bituminous material, the particulate material by means of a first conveyor is fed into the engagement zone, and that the wheel's action will fragment the materials and at the same time mix the fragmented bituminous materials and the particulate materials, and transport the material past a sieve, where material having a particle size smaller than the sieve size will leave the mixing chamber and be collected and stored in suitable storage means.

The addition of particulate materials in the engagement zone effectively alleviates the build up of sticky bitumen on the milling and/or crushing wheel such that continuous effective working on the bituminous products forced into the engagement zone by the second conveyor may be effectuated. As the two materials, i.e. the particulate material and the bituminous waste material are introduced into the engagement section, they will due to the action of the milling and/or crushing wheel be transported away from the crushing zone and into the mixing chamber. A certain amount of material may build up inside the mixing chamber, but particles both of the bitumen material and the particulate material having reached a size corresponding to the sieve's size, i.e. the holes in the sieve, will leave the mixing chamber through the sieve for collection for example on a conveyor which will convey the materials away for further usage or storage. The particulate material added in the engagement zone from the first hopper via the first conveyor makes it possible to fragmentise the bituminous products without the wheel or the sieve plugging up.

The addition of particulate material will furthermore aid the crushing wheel in fragmenting the bituminous material, clean the crushing wheel in the process, and create a relatively homogenous distribution of bituminous and particulate material in the finished product.

In a further advantageous embodiment, the method further foresees that a feeder wheel is arranged above the second conveyor and where said feeder wheel may be brought to rotate such that it either forces the material in the second hopper towards the mixing chamber or away from the mixing chamber and in this manner regulates the input of material and/or the amount of material from the second hopper in relation to the amount of material from the first hopper. As the bituminous products, i.e. bituminous waste products, placed in the second hopper may have very different properties depending on how and in what shape they were delivered, i.e. whether it was scrap from the production of bituminous products, or it was waste from renovating membranes or roof surfaces, it may be advantageous to have a feeder wheel which can, in combination with the second conveyor force the material into the engagement zone in order to obtain a desired mix between the amount of particulate material added by the first conveyor into the engagement zone or in order to not overflow the mixing chamber with bituminous material. In the first instance, the feeder wheel will rotate such that the underside of the feeder wheel engaging the waste materials placed in the second hopper forces/urges the material in the same direction, and in the second instance where less bituminous material is desired in the engagement zone, the feeder wheel may be brought to rotate opposite the transport direction whereby a certain build-up of waste material may be accumulated before the feeder wheel.

In a further variation of the method in a further advantageous embodiment, the particulate material is crushed asphalt, in particular former road surfacing, where the material has a grain size between 5 mm and 35 mm, more preferred between 8 mm and 20 mm. This is a particularly advantageous embodiment in that the crushed asphalt will contain a certain amount of bitumen such that there will be a certain correlation between the two types of material which in practice has resulted in the fact that the resulting material, i.e. the mix of particulate material being crushed asphalt and the bituminous waste products, may be utilised as fresh paving material for example for roads and other surfaces. This is due to the fact that during the placing of the asphalt, for example in a road paver, the asphalt material is heated whereby the bitumen content of the bituminous products as well as the bitumen in the asphalt matrix will melt and in this manner melt together and become one and single mass corresponding to a normal asphalt combination.

Bituminous products, in particular roofing materials and membranes, are usually manufactured by having a netting or felt made from a polymeric material where said material is a so-called carrier web. The carrier web is thereafter impregnated or cast into a bituminous mass in order to produce the bituminous roofing products or membranes. During the impregnation and mixing in the mixing chamber, these carrier webs will also disintegrate, and as they only constitute a relatively minor part of the overall material mass, they have no influence on the characteristics of the resulting product such that an asphalt paving being made from materials resulting from the inventive method according to the present invention will not have a lesser quality than comparable asphalt pavings.

In a further advantageous method step, the material collected after having passed the sieve is exposed to a magnet where magnetic particles are collected, and that the rest of the materials is stored in containers, big bags or the like. The magnet makes sure that nails and the like, for example used in connection with fastening the roofing material, especially when the roofing material is in the shape of singles, to an underlying roof structure are collected and thereby removed from the resulting material.

The resulting material may be used directly in an asphalt production plant or may be stored in containers, big bags or the like for further use, either on the same site or choose of storage means, for example containers or big bags, which may easily be transported by road to further sites. Due to the interaction between the mineral aggregate when the particulate material is crushed asphalt or the interaction between the particulate material being other types of materials, it is possible to produce a combined material being the resulting material, which does not exhibit the sticky characteristics normally connected with bituminous products. Also the particulate material may be selected such that the resulting material will not have this sticky consistency at ambient temperatures whereby storage in big bags or containers becomes possible such that the resulting material may maintain a substantially particular nature and will not "melt" together due to the interaction between the bituminous contents of the resulting material.

In a further advantageous embodiment of the method, the engagement zone is arranged below equator of the milling and/or crushing wheel. This aspect facilitates that the materials introduced in the engagement zone will be transported directly out of the engagement zone and into a crushing position between the milling and/or crushing wheel and the walls of the mixing chamber or leave the mixing chamber all together through the sieve means as explained above. Had the engagement zone been arranged at or above the equator of the milling and/or crushing wheel where the milling and/or crushing wheel has a direction of rotation being downwards in the engagement zone, the introduced material would have blocked for further introduction of materials, and the efficiency of the entire device would have been less.

Above, reference is made to a milling and/or crushing wheel being placed in the mixing chamber. For some types of materials, it may be advantageous to have the wheel equipped with teeth or other means extending/projecting from the surface of the wheel such that the fragmentation of the reusable bituminous materials may happen in a mill-fashion where the projecting members will cut/slash the bituminous materials. For other types of materials, it may be advantageous to provide grooves or notches on the outside of the wheel such that as the wheel rotates, a crushing process will take place due to the interaction between the wheel, the bituminous materials and the introduced particulate material. It may also be possible to have a combination of both features such that the combined action may be imparted to the waste material.

The invention also comprises an apparatus for carrying out the method as disclosed above where said apparatus is special in that the apparatus comprises:

a first hopper having inlet and outlet means;
a second hopper having an inlet and outlet means;
a mixing chamber;
a first conveyor means having a first end arranged adjacent the outlet of the first hopper and a second end adjacent and in communication with the mixing chamber;
a second conveyor means arranged along the bottom of the second hopper means, and in communication with the mixing chamber;
a milling and/or crushing cylinder arranged inside the mixing chamber;
a sieve means being a part of the lower wall portion of the mixing chamber;
material receiving means arranged outside the mixing chamber adjacent the sieve means.

In a further advantageous embodiment, the milling and/or crushing cylinder is arranged for rotation about an axis perpendicular to the transport direction of the second conveyor means, and where teeth are arranged projecting from the cylindrical surface of the milling and/or crushing cylinder. In this embodiment, the cylinder will be lying down, but it is also contemplated within the scope of the invention that the cylinder with reference to the embodiment mentioned above may have other or different orientations, and that more than one milling and/or crushing cylinder may be provided in the mixing chamber whereby the combined action of for example two or three cylinders may increase the productivity of the apparatus and/or the quality of the resulting product.

In a further advantageous embodiment, the outlet means of the first hopper comprises a feeder unit for dosing the material from the hopper onto the first conveyor means, and that furthermore the feeder unit may comprise vibration means.

These features foresee that depending on the amount of bituminous material introduced into the mixing chamber, an appropriate amount of particulate material will be introduced such that an optimal fragmentation of the bituminous materials as well as an optimal mix between the bituminous waste materials and the crushed particle material may be achieved. In order to make sure that the particulate material will be substantially homogenously and evenly introduced into the mixing chamber, vibration means may be arranged in the outlet means such that the particulate material is separated during the transfer from the harbour to the first conveyor means.

In order to adjust the amount of bituminous material being introduced into the mixing chamber, a feeder wheel is arranged above the second conveyor means where the wheel is arranged for rotation about an axis perpendicular to the transport direction of the second conveyor means, and that the wheel's extension perpendicular to the second conveyor means substantially corresponds to the width of the second conveyor means. In this manner, it becomes possible to adjust the amount of bituminous material in accordance with the capacity of the mixing chamber and the introduced particulate material into the mixing chamber in order to achieve the optimal resulting product.

The feeder wheel may furthermore be adjusted such that the vertical distance between the feeder wheel and the second conveyor means is adjustable, and where the means for adjusting the distance may comprise hydraulic or electrical telescopic means, or a pivotal arm having actuating means, where said arm is arranged between a non-moving frame of the second conveyor means and the feeder wheel. The wheel may in a further advantageous embodiment comprise means for rotating the wheel in both directions. The means may for example be a hydraulic motor or an electrical motor.

In order to collect magnetic objects such as for example nails, pipes etc. from the resulting product, a magnetic device is arranged adjacent the seat means such that magnetic items are collected from the finished product in a further advantageous embodiment.

Due to the very effective process in the mixing chamber, it is possible in a further advantageous embodiment to arrange the first hopper; the second hopper; the mixing chamber; the first conveyor means; the second conveyor means; the milling and/or crushing cylinder; the sieve means being a part of the lower wall portion of the mixing chamber; and the material receiving means arranged outside the mixing chamber adjacent the sieve means, all are arranged on a trailer, thereby constituting a mobile unit suitable for road transport. By being able to place the entire factory, i.e. the reusing apparatus, on a mobile unit, it is possible to place the unit at strategic positions where the logistics in connection with reusing/regenerating bituminous waste products into new useful materials may be optimised. This may for example be at collection points where bituminous waste products may be accumulated during a period of time whereafter the apparatus as described above is transported to the storage point for working the bituminous material into the reusable resulting material as explained above. The versatility of the apparatus and in particular when placed on a trailer suitable for road transport greatly enhances the usability of the apparatus as well as reduces the cost in reworking these types of materials for further use.

SHORT DESCRIPTION OF THE DRAWING

The invention will now be explained with reference to the accompanying drawing wherein FIG. 1 illustrates a schematic view of one embodiment of the invention.

DETAILED DESCRIPTION OF THE INVENTION

The apparatus 1 according to the invention is in this embodiment placed on a trailer 2 suitable for road transport. In this embodiment, the trailer comprises three axles 3',3",3'" as well as a fifth wheel connection point 4 and a support leg 5. All these are well-known in the art and may be selected according to the load which is to be placed on the trailer 2. The number of axles and wheels arranged on the axles 3',3",3'" will be selected according to the loads allowed on the roads in the countries in question.

On top of the trailer bed 2, a first hopper 5 is placed into which particulate material is placed. The particulate material may for example be crushed asphalt, and in particular particles having a size between eight and twenty millimetres are preferred for this particular use. The particulate material placed in the hopper 5 is by means of a feeding and vibration unit 6 dosed onto a first conveyor 7. The first conveyor connects the dosing and feeding unit 6 with a mixing chamber 8. The bituminous material to be reused is placed in a second hopper 9. In the actual case, the second hopper is approximately 5 meters long and has a width substantially corresponding to the width of the trailer and converging side walls downwards towards a second means 10. The second conveyor means may be any suitable means, but in particular a transport chain conveying the reusable bituminous materials illustrated by reference number 11 is used. The bituminous materials 11 may be scrapped from production of roof membranes or may be roofing shingles or the like. Due to the nature of these products, they may have very odd sizes and shapes, and it is therefore advantageous to provide a hopper being as big as possible in order to accommodate as much material as possible inside the hopper 9. In order to facilitate the transport of the materials into the mixing chamber 8, a feeder wheel 12 is provided above the second hopper 9. The feeder wheel 12 may be operated such that it rotates in both directions in order to regulate the amount of waste material 11 introduced into the mixing chamber 8. Where the waste material 11 is introduced into mixing chamber, a so-called engagement zone 13 is arranged. In this engagement zone, a milling and/or crushing wheel in the shape of a cylinder 14 is arranged such that the materials introduced into the mixing chamber from the second hopper will be torn, slashed or otherwise fragmented. The first conveyor conveys the particulate material into the mixing chamber in a position where the particulate material will enter the mixing chamber also in the engagement zone 13 such that a thorough mixing is achieved at the same time as the fragmentation of the waste material 11 is carried out. The particulate material furthermore hinders that the bituminous material will smear or clog up the milling and/or crushing wheel 14 such that a substantially maintenance free operation is provided. The materials will be mixed inside the mixing chamber due to the action of the cylinder 14, and as the particles inside the mixing chamber are fragmented into a predetermined size, they may leave the mixing chamber through a sieve 15 provided in a bottom section of the mixing chamber 8. For practical purposes, the openings in the sieve 15 will be between twenty and thirty millimetres in that the resulting material which will leave the mixing chamber 8 through the sieve means 15 having a size between zero and twenty-five millimetres is easy to use in for example further new pavements or the like.

The crushing cylinder 14 is provided with a plurality of teeth, such that as the material is engaged by the teeth, the material will be fragmentised between the cylinder (and in particular the teeth) and the sieve. The teeth may be provided with replaceable tips, such that as they wear down, they may easily be replaced. Furthermore, the surface of the sieve facing the cylinder may likewise be provided with teeth, offset from the teeth on the cylinder, such that material being of a certain size, will be torn apart between the teeth on the cylinder resp. the sieve.

The materials passing through the sieve means 15 are in this example collected by a third conveyor 16 which conveyor will place the resulting material in appropriate storage means for example big bags, a container or a further hopper, for example a hopper in connection with an asphalt producing plant. Immediately adjacent the third conveyor 16, a magnet 17 is arranged such that foreign magnetic objects may be removed from the resulting material.

One of the features which has proven to improve the workability of the device is the fact that the engagement zone 13 is arranged below equator 20 of the milling and/or crushing wheel such that the particulate material as well as the bituminous waste material 11 are brought together below the equator 20 whereby it will be forced due to the turning action of the wheel into the mixing chamber and due to the interaction between the projecting teeth 21 arranged around the cylindrical periphery of the milling and/or crushing wheel 14, the materials introduced in the engagement zone will be further fragmented and eventually leave the mixing chamber through the sieve means 15.

The invention claimed is:

1. Method for reusing bituminous material products, where a particulate material having a grain size between 5 mm and 35 mm is placed in a first hopper, wherein the bituminous material having bitumen containing products are placed in a second hopper, and that in the bottom of the second hopper, conveyor means urges the bituminous material into a mixing chamber, and that inside said mixing chamber a milling and/or crushing wheel is arranged, which wheel engages and crushes/mills the material transported from the second hopper in an engagement zone, and at the same position as the wheel engages the bituminous material, the particulate material by means of a first conveyor is fed into the engagement zone, and that the wheel's action will fragment the materials and at the same time mix the fragmented bituminous materials and the particulate materials, and transport the material past a sieve, where material having a particle size smaller than the sieve size will leave the mixing chamber and be collected and stored in suitable storage means.

2. Method according to claim 1, wherein a feeder wheel is arranged above the second conveyor and where said feeder wheel may be brought to rotate such that it either forces the material in the second hopper towards the mixing chamber or away from the mixing chamber and in this manner regulates the input of material, and/or the amount of material from the second hopper in relation to the amount of material from the first hopper.

3. Method according to claim 1, wherein the particulate material is crushed asphalt, where the material has a grain size between 5 mm and 35 mm.

4. Method according to claim 3, wherein the material has a grain size between 8 mm and 20 mm.

5. Method according to claim 1, wherein the material collected after having passed the sieve is exposed to a magnet where magnetic particles are collected, and that the rest of the materials is stored in containers.

6. Method according to claim 1 wherein the milling and/or crushing wheel rotates such that the movement of the wheel in the engagement zone will be downwards and that the engagement zone is arranged below equator of the milling and/or crushing wheel.

7. Apparatus for reusing bituminous materials, wherein the apparatus comprises:
   a first hopper for receiving particulate material, said first hopper having inlet and outlet means;
   a second hopper for receiving bitumen containing products, said second hopper having inlet and outlet means;
   a mixing chamber;
   a first conveyor means having a first end arranged adjacent the outlet of the first hopper and a second end adjacent and in communication with the mixing chamber, said first conveyor for conveying particulate material from said first hopper to said mixing chamber;
   a second conveyor means arranged along the bottom of the second hopper means, and in communication with the mixing chamber, said second conveyor for conveying bitumen containing products from said second hopper to said mixing chamber, said second conveyor for conveying bitumen containing products from said second hopper to said mixing chamber;
   a milling and/or crushing cylinder arranged inside the mixing chamber;
   a sieve means being a part of the lower wall portion of the mixing chamber, said sieve means for sieving mixing chamber output; and
   material receiving means arranged outside the mixing chamber adjacent the sieve means, said material receiving means adapted to receive the sieved mixing chamber output, wherein the apparatus is operable to mix particulate material from said first hopper with bitumen containing products from said second hopper at an engagement zone at a surface of said milling and/or crushing cylinder, and wherein said milling and/or crushing cylinder is operable to mill and/or crush the mix of particulate material and bitumen containing products to output a reusable bituminous material mix.

8. Apparatus according to claim 7 wherein the milling and/or crushing cylinder is arranged for rotation about an axis perpendicular to the transport direction of the second conveyor means, and where teeth are arranged projecting from the cylindrical surface of the milling and/or crushing cylinder.

9. Apparatus according to claim 7, wherein the outlet means of the first hopper comprises a feeder unit, for dosing the material from the hopper onto the first conveyor means, and that furthermore the feeder unit may comprise vibration means.

10. Apparatus according to claim 7, wherein a feeder wheel is arranged above the second conveyor means, where the wheel is arranged for rotation about an axis perpendicular to the transport direction of the second conveyor means, and that the wheel's extension perpendicular to the second conveyor means substantially corresponds to the width of the second conveyor means.

11. Apparatus according to claim 10, wherein the vertical distance between the feeder wheel and the second conveyor means is adjustable, and where the means for adjusting the distance may comprise hydraulic or electrical telescopic means, or a pivotal arm having actuating means, where said arm is arranged between a non-moving frame of the second conveyor means and the feeder wheel.

12. Apparatus according to claim 10, wherein the feeder wheel comprises means for rotating the wheel in both directions.

13. Apparatus according to claim 7, wherein adjacent the sieve means a magnetic device is arranged, such that magnetic items are collected from the finished product.

14. Apparatus according to claim 7 wherein the first hopper; the second hopper; the mixing chamber; the first conveyor means; the second conveyor means; the milling and/or crushing cylinder; the sieve means being a part of the lower wall portion of the mixing chamber; and the material receiving means arranged outside the mixing chamber adjacent the sieve means, all are arranged on a trailer, thereby constituting a mobile unit suitable for road transport.

* * * * *